United States Patent Office 3,707,358
Patented Dec. 26, 1972

3,707,358

CRYSTAL SUPPORT FOR A SEMICONDUCTOR CRYSTAL

Annegien Masselink, Martinus Antonius Maria Bakker, and Bauke Visser, Emmasingel, Eindhoven, Netherlands, assignors to U.S. Philips Corporation, New York, N.Y.

No Drawing. Filed June 24, 1970, Ser. No. 49,500
Claims priority, application Netherlands, June 27, 1969, 6909889; Jan. 24, 1970, 7001030
Int. Cl. B23p 3/00
U.S. Cl. 29—195 3 Claims

ABSTRACT OF THE DISCLOSURE

A crystal support for a semiconductor crystal, preferably consisting of iron or an iron alloy which is coated with a gold layer to which the crystal is secured by means of solder. An intermediate layer of a metal which crystallizes in a hexagonal densest packing, particularly cobalt is provided between the metal of the crystal support and the gold layer.

The invention relates to a crystal support for a semiconductor crystal.

Such a crystal support, such as a base which usually consists of iron or an iron alloy, but may alternatively consist of copper, nickel or alloys of these metals, usually has a plurality of insulated electrical lead-through wires for which glass is the commonly used insulation material, and furthermore the semiconductor crystal is mounted on this base. There is also an embodiment wherein such a base is embedded in a synthetic resin. Contact combs or contact strips on which the semiconductor crystal is mounted also serve as a crystal support. This mounting process is effected with the aid of soldering, for example, by means of tin, an alloy of tin and indium or a eutectic alloy of gold and silicon. Since iron and iron alloys are wetted poorly with these soldering metals, a thin layer of gold is provided which is wetted satisfactorily.

An elevated temperature, approximately 1100° C., is necessary for making an adherent glass-to-metal seal when sealing the lead-through wires in the crystal support. During this thermal treatment, growth of the crystal takes place in the iron or the iron alloy, so that a fairly coarse crystalline structure is created. The gold layer which is precipitated thereon likewise acquires a coarse crystalline structure and the result thereof is that the wetting properties of the gold become greatly increased, namely to such an extent that in many cases the solder has already flowed over the gold surface before wetting of and adherence to the semiconducting crystal have been able to take place. As a result, in these cases a poor soldered joint having many cavities is produced.

The experiments which led to the present invention indicated that the phenomenon of the gold layer obtaining a coarse structure when the layer underneath has also coarse crystallites must be probably ascribed to the fact that both gold and iron, copper, nickel and the usual alloys on the basis of iron, copper or nickel crystallize to a cubic lattice. In fact, it was found that when it is only ensured that the gold layer is provided on a metal layer whose atoms or molecules are not present in a cubic packing in the lattice, this layer is deposited in a fine crystalline form.

According to the invention the crystal support is made of a metal which crystallizes in a close-packed hexagonal structure. However, for practical reasons the usual material is preferably used on which a layer of such a metal is provided which crystallizes in a close-packed hexagonal structure. The last-mentioned layer then functions as a growing barrier. The gold, which is precipitated, for example, by way of electroplating or by chemical reduction from a solution of a gold salt on the intermediate layer then does not adapt to their naturally coarse crystalline structure, as is the case for the above-mentioned metals, but is precipitated in a fine crystalline form. This fine crystalline gold has exactly the wetting properties required for this purpose. As a result an excellent eminent soldered joint is obtained.

Cobalt crystallizes in an alternately hexagonal and cubic packing. For the relevant purpose cobalt has the additional advantage that it does not substantially dissolve in gold so that substantially no gold diffuses into the layer underneath during soldering. This is indeed the case for iron and iron alloys. The use of a cobalt intermediate layer then means that a thinner gold layer may suffice.

Also ruthenium, osmium, rhenium, titanium or zirconium are suitable as materials for a crystal support or an intermediate layer within the scope of the present invention.

The invention will now be described in detail with reference to an example.

Bases of envelopes of semiconductor crystals which bases consist of round plates of an iron alloy of the composition in percent by weight Fe 54, Ni 28 and Co 18 and having current conductors led through via glass beads were electrolytically coated with a 0.2 to 2$\mu$ thick cobalt layer by means of an aqueous solution having a pH of 3–4 which contained per litre:

| | G. |
|---|---|
| $CoSO_4 \cdot 6H_2O$ | 200 |
| NaCl | 20 |

and boric acid until saturation. This bath was used at a temperature of 50° C. and a current density of 1–3 a./sq. dm. 1 to 2$\mu$ thick gold layer was provided on said layer by electroplating by means of an aqueous electrolyte containing per litre:

15–25 g. KAu $(CN)_2$ and
50 g. of citric acid which was brought by addition of KOH to a pH of 6. This bath was used at a temperature of 60° C. and a current density of 250 ma./sq. dm.

A silicon crystal was secured thereto by means of soldering with the aid of solder having the eutectic composition of Au-Si with 6% by weight of Si at a melting point of 378° C. Thus an adherent joint was obtained.

What is claimed is:

1. In a semiconductor crystal support device comprising a base and a layer of gold on the base, and to which a semiconductor crystal is soldered onto the gold-layer on the base, the improvement comprising an intermediate layer on the base and under the gold layer, said intermediate layer being a metal crystallized in the close-packed hexagonal structure.

2. In a semiconductor device as claimed in claim 1, wherein said support base comprises a metal selected from the group consisting of iron, iron alloy, copper, copper alloy, nickel and nickel alloy.

3. In a semiconductor device as claimed in claim 1, wherein said intermediate layer consists of cobalt.

References Cited

UNITED STATES PATENTS

| | | | |
|---|---|---|---|
| 3,364,064 | 1/1968 | Wijburg | 29—196.6 X |
| 3,204,158 | 8/1965 | Schreiner | 29—195.5 X |
| 3,248,681 | 4/1966 | Reintgen | 29—196.6 X |

FOREIGN PATENTS

| | | | |
|---|---|---|---|
| 719,803 | 12/1954 | Great Britain | 29—199 |

OTHER REFERENCES

William Hume-Rothery, The Structure of Metals and Alloys, Institute of Metals and Institution of Metallurgists, London, 1969, p. 108.

Metals Handbook, 1948, American Society for Metals, Cleveland, Ohio, pp. 20 and 21.

L. DEWAYNE RUTLEDGE, Primary Examiner

J. E. LEGRU, Assistant Examiner

U.S. Cl. X.R.

29—196, 196.6, 199; 317—234 R, 234 L, 234 M

PO-1050
(5/69)

UNITED STATES PATENT OFFICE
CERTIFICATE OF CORRECTION

Patent No. 3,707,358 Dated December 26, 1972

Inventor(s) ANNEGIEN MASSELINK, MARTINUS A.M.BAKKER & BAUKE VISSER

It is certified that error appears in the above-identified patent and that said Letters Patent are hereby corrected as shown below:

Column 2, lines 41 and 42, change "1-3 a./sq. dm. 1 to 2/u"

to -- 1-3 A/sq.dm. A 1 to 2/u--;

line 49, change "250 ma./sq. dm." to

--250 mA/sq.dm.--.

Signed and sealed this 15th day of May 1973.

(SEAL)
Attest:

EDWARD M.FLETCHER,JR.
Attesting Officer

ROBERT GOTTSCHALK
Commissioner of Patents